(12) United States Patent
Gedrimas

(10) Patent No.: US 10,864,848 B2
(45) Date of Patent: Dec. 15, 2020

(54) REVERSE LIGHTS TRAILER HITCH ASSIST

(71) Applicant: Continental Automotive Systems, Inc., Auburn Hills, MI (US)

(72) Inventor: Noah Joseph Gedrimas, Dryden, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 0 days.

(21) Appl. No.: 16/721,270

(22) Filed: Dec. 19, 2019

(65) Prior Publication Data

US 2020/0198533 A1 Jun. 25, 2020

Related U.S. Application Data

(60) Provisional application No. 62/783,874, filed on Dec. 21, 2018.

(51) Int. Cl.
| | | |
|---|---|---|
| *B60Q 1/50* | (2006.01) | |
| *B60Q 1/30* | (2006.01) | |
| *B60Q 1/22* | (2006.01) | |
| *B60Q 1/44* | (2006.01) | |
| *B60D 1/36* | (2006.01) | |

(52) U.S. Cl.
CPC ........... *B60Q 1/50* (2013.01); *B60Q 1/22* (2013.01); *B60Q 1/30* (2013.01); *B60Q 1/44* (2013.01); *B60D 1/36* (2013.01)

(58) Field of Classification Search
CPC .......... B60Q 1/0011; B60Q 1/02; B60Q 1/22; B60Q 1/26; B60Q 1/30; B60Q 1/44; B60Q 2300/20; B60Q 2300/22; B60D 1/24; B60D 1/36; G05D 1/021; G05D 1/0231; G05D 1/0246
See application file for complete search history.

(56) References Cited

U.S. PATENT DOCUMENTS

| | | | |
|---|---|---|---|
| 5,719,552 A | 2/1998 | Thompson | |
| 5,769,526 A | 6/1998 | Shaffer | |
| 9,849,830 B1* | 12/2017 | Salter | F21S 43/16 |
| 2005/0074143 A1* | 4/2005 | Kawai | B62D 13/06 |
| | | | 382/104 |

(Continued)

FOREIGN PATENT DOCUMENTS

| | | |
|---|---|---|
| DE | 102013017213 A1 | 4/2015 |
| FR | 2936988 A1 | 4/2010 |
| WO | 2006093464 A1 | 9/2006 |

OTHER PUBLICATIONS

International Search Report and Written Opinion dated Apr. 8, 2020 for the counterpart PCT Application No. PCT/2019/068061.

*Primary Examiner* — Jason Crawford

(57) ABSTRACT

A method for controlling one or more lights of a light system supported by a vehicle is provided. The method includes receiving sensor system data from a sensor system supported by the vehicle and determining a current status associated with the one or more lights of the vehicle light system. The method includes determining an updated status associated with the one or more lights of the vehicle light system based on the sensor system data. The method also includes transmitting instructions to the light system. The instructions cause the one or more lights to adjust their current status based on the updated status.

16 Claims, 4 Drawing Sheets

(56) References Cited

U.S. PATENT DOCUMENTS

| | | | |
|---|---|---|---|
| 2006/0018641 A1* | 1/2006 | Goto | B60R 25/1004 |
| | | | 396/4 |
| 2006/0255560 A1* | 11/2006 | Dietz | B60D 1/36 |
| | | | 280/477 |
| 2008/0180526 A1* | 7/2008 | Trevino | B60D 1/36 |
| | | | 348/148 |
| 2010/0014711 A1* | 1/2010 | Camhi | B60Q 3/80 |
| | | | 382/104 |
| 2010/0039515 A1* | 2/2010 | Dietz | B60D 1/36 |
| | | | 348/148 |
| 2014/0049973 A1* | 2/2014 | Adachi | B60Q 11/00 |
| | | | 362/465 |
| 2014/0226009 A1* | 8/2014 | Lynam | B60R 1/00 |
| | | | 348/148 |
| 2014/0309864 A1* | 10/2014 | Ricci | A61B 5/0077 |
| | | | 701/36 |
| 2015/0345938 A1 | 12/2015 | Salter et al. | |
| 2015/0345939 A1* | 12/2015 | Salter | B60Q 1/305 |
| | | | 356/138 |
| 2016/0016507 A1 | 1/2016 | Cheng | |
| 2016/0052548 A1* | 2/2016 | Singh | B60D 1/36 |
| | | | 701/37 |
| 2016/0288601 A1* | 10/2016 | Gehrke | G06K 9/6201 |
| 2017/0106784 A1 | 4/2017 | Gondhi et al. | |
| 2018/0147900 A1* | 5/2018 | Shank | B60R 25/25 |
| 2018/0191937 A1* | 7/2018 | Frederick | B60Q 1/245 |
| 2019/0077305 A1* | 3/2019 | Kita | G06K 9/0061 |
| 2020/0001783 A1* | 1/2020 | Suzuki | B60Q 3/80 |
| 2020/0001919 A1* | 1/2020 | Niewiadomski | B62D 15/0285 |
| 2020/0073398 A1* | 3/2020 | Niewiadomski | G05D 1/0094 |
| 2020/0164798 A1* | 5/2020 | Cardimen | B60Q 11/005 |
| 2020/0184669 A1* | 6/2020 | Stent | G06T 7/70 |

\* cited by examiner

300

Receiving, At Data Processing Hardware, Sensor System Data From A Sensor System Supported By The Vehicle
302

Determining, At The Data Processing Hardware, A Current Status Associated With The One Or More Lights Of The Vehicle Light System
304

Determining, At The Data Processing Hardware, An Updated Status Associated With The One Or More Lights Of The Vehicle Light System Based On The Sensor System Data
306

Transmitting, From The Data Processing Hardware To The Light System In Communication With The Data Processing Hardware, Instructions Causing The One Or More Lights To Adjust Their Current Status Based On The Updated Status
308

FIG. 3

REVERSE LIGHTS TRAILER HITCH ASSIST

CROSS REFERENCE TO RELATED APPLICATIONS

This U.S. patent application claims priority under 35 U.S.C. § 119(e) to U.S. Provisional Application 62/783,874, filed on Dec. 21, 2018, which is hereby incorporated by reference in its entirety.

TECHNICAL FIELD

This disclosure relates to a tow vehicle configured to attach to a trailer. The tow vehicle provides rear illumination when the tow vehicle is parked, allowing a driver to view the trailer when hitching or un-hitching the trailer from the tow vehicle.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel, a gooseneck, or a trailer jack. Other attachment mechanisms may also be used. In addition to the mechanical connection between the trailer and the powered vehicle, in some examples, the trailer is electrically connected to the tow vehicle. As such, the electrical connection allows the trailer to take the feed from the powered vehicle's rear light circuit, allowing the trailer to have taillights, turn signals, and brake lights that are in sync with the powered vehicle's lights.

When backing up to a trailer at night, reverse lights of a tow vehicle may be used to position a tow vehicle receiver hitch under a trailer coupler of the trailer. Once in position, the tow vehicle is put in park which turns off the reverse lights of the tow vehicle. The driver gets out of the tow vehicle to attach or detach the tow vehicle and the trailer (e.g., attaching/detaching chains, electrical connection, receiver, lights, etc. in the dark, which may be inconvenient and dangerous. Therefore, it is desirable to have a tow vehicle capable of overcoming the current obstacles.

SUMMARY

One aspect of the disclosure provides a method for controlling one or more lights of a light system supported by a vehicle (e.g., a tow vehicle). The method includes receiving, at data processing hardware, sensor system data from a sensor system supported by the vehicle. The method includes determining, at the data processing hardware, a current status associated with the one or more lights of the vehicle light system (e.g., an ON status or an OFF status). The method includes determining, at the data processing hardware, an updated status associated with the one or more lights of the vehicle light system based on the sensor system data. The method includes transmitting, from the data processing hardware to the light system in communication with the data processing hardware, instructions causing the one or more lights to adjust their current status based on the updated status.

Implementations of the disclosure may include one or more of the following optional features. In some implementations, the one or more lights are facing a rearward direction with respect to the vehicle and are configured to illuminate a rearward environment of the vehicle. The one or more lights may include at least one of a tail light, a brake light, a reverse light, and a stop light. Additionally, the one or more lights may include side vehicle lights positioned on the side of the vehicle.

In some implementations, the sensor system data includes images captured by one or more cameras positioned to face a rearward environment of the vehicle. Additionally or alternatively, the sensor system data may include sensor data captured by one or more sensors positioned to face a rearward environment of the vehicle. Additionally or alternatively, in some examples, the sensor system data includes driver data indicative of a status of the driver in the vehicle. The driver data may be captured by a seat sensor (not shown), one or more camera or one or more sensors positioned to capture data associated with the driver and the driver seat. In some examples, the sensor system data includes data from a door sensor indicative of a driver door status being open or closed. In some examples, the updated status extends for a predetermined period of time.

In some implementations, the method includes receiving steering wheel data during a rearward maneuver of the vehicle and determining a vehicle behavior indicative of the vehicle approaching a trailer based on the sensor system data and the steering wheel data. In some examples, the vehicle behavior is determined by sensor data indicative of the trailer behind the vehicle and the steering wheel data. The updated status associated with the one or more lights of the vehicle light system is based on the vehicle behavior.

Another aspect of the disclosure provides a system for controlling one or more lights of a light system supported by a vehicle. The system includes a vehicle light system including one or more lights and data processing hardware in communication with the vehicle light system. The system also includes memory hardware in communication with the data processing hardware. The memory hardware stores instructions that when executed on the data processing hardware cause the data processing hardware to perform operations that include the method described above.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3 is a schematic view of an exemplary arrangement of operations for controlling one or more lights of a vehicle light system.

Like reference symbols in the various drawings indicate like elements.

DETAILED DESCRIPTION

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a trailer hitch. It is desirable to have a tow vehicle that provides rearward illuminations to aid the driver, for example, while hitching the tow vehicle to the trailer or to aid the driver while un-hitching the tow vehicle from the trailer.

Figure 1A:
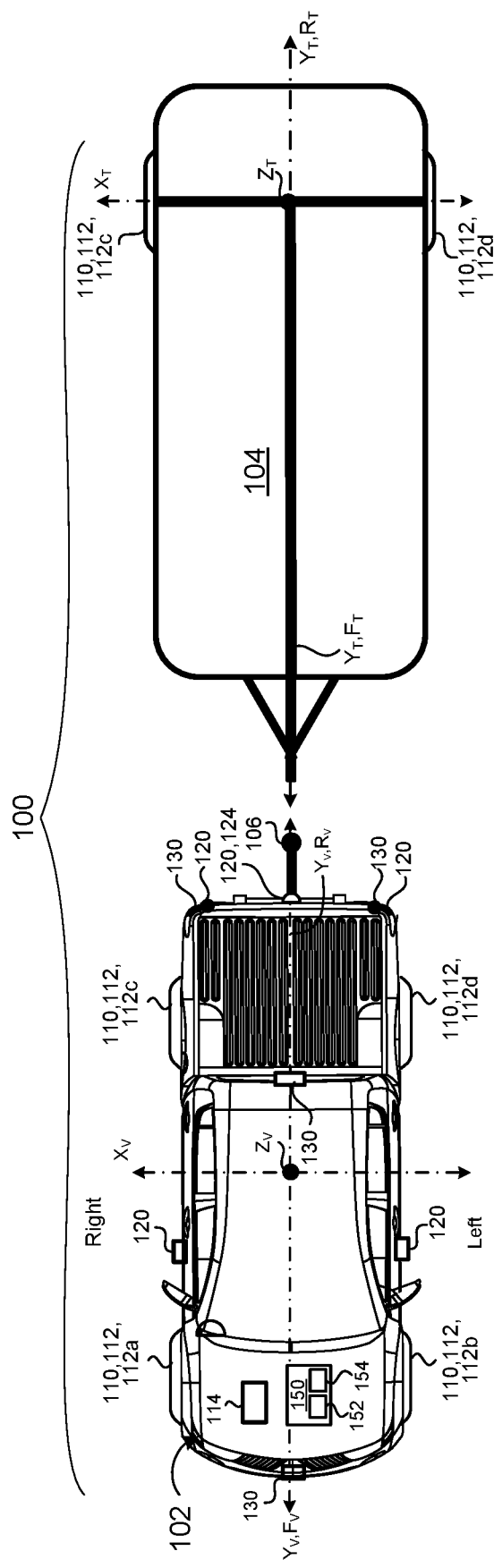
FIG. 1A is a perspective view of an exemplary tow vehicle positioned in front of a trailer.
Figure 1B:
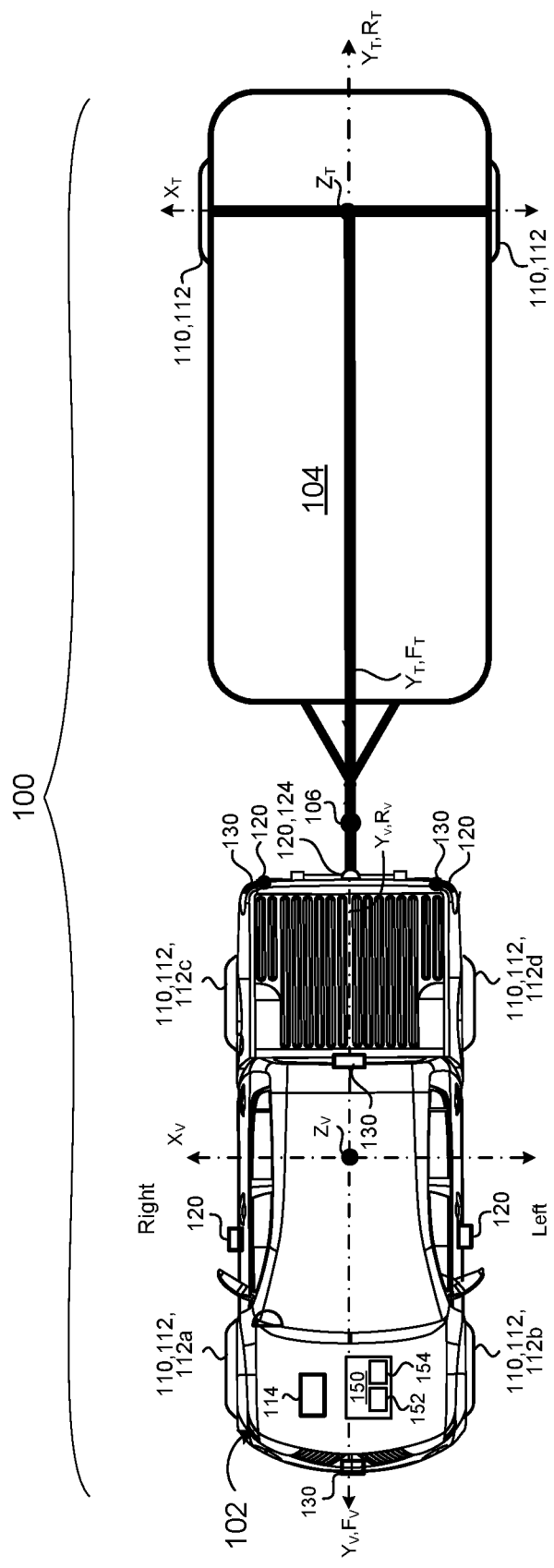
FIG. 1B is a perspective view of the exemplary tow vehicle shown in FIG. 1A hitched to the trailer.
Figure 2:
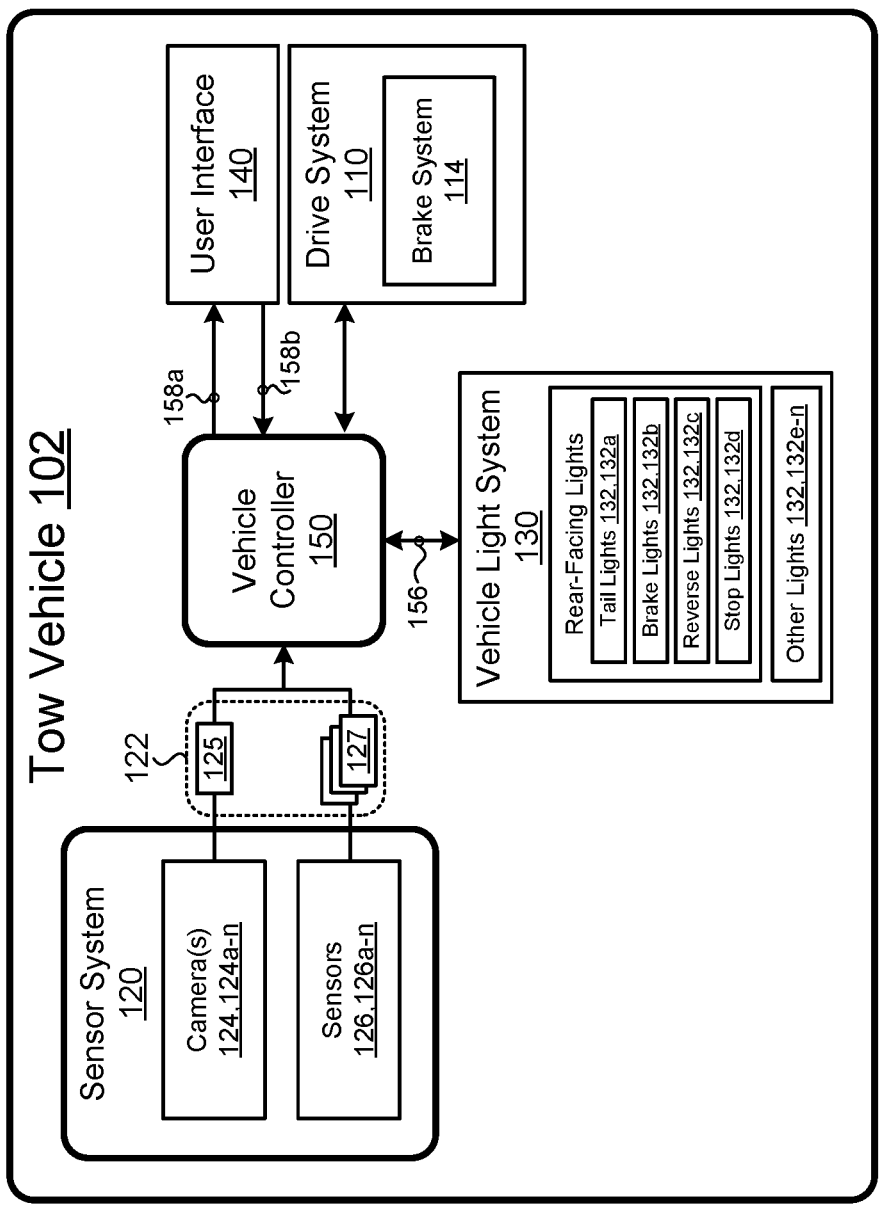
FIG. 2 is a schematic view of an exemplary tow vehicle.

Referring to FIGS. 1A, 1B, and 2, in some implementations, a vehicle-trailer system 100 includes a tow vehicle 102 hitched to a trailer 104 by way of a vehicle hitch 106. The tow vehicle 102 includes a drive system 110 associated with the tow vehicle 102 that maneuvers the tow vehicle 102 and thus the vehicle-trailer system 100 across a road surface based on drive maneuvers or commands having x, y, and z components, for example. As shown, the drive system 110 includes a front right wheel 112, 112a, a front left wheel 112, 112b, a rear right wheel 112, 112c, and a rear left wheel 112, 112d. In addition, the drive system 110 may include wheels (not shown) associated with the trailer 104. The drive system 110 may include other wheel configurations as well. The drive system 110 may include a motor or an engine that converts one form of energy into mechanical energy allowing the tow vehicle 102 to move. The drive system 110 includes other components (not shown) that allow the tow vehicle 102 to move, thus also moving the trailer 104 when the tow vehicle 102 is attached to the trailer 104. The drive system 110 may also include a brake system 114 that includes brakes (not shown) associated with each wheel 112, 112a-d, where each brake is associated with a wheel 112a-d and is configured to slow down or stop the wheel 112a-n from rotating. In some examples, the brake system 114 is connected to one or more brakes supported by the trailer 104. The vehicle-trailer system 100 may include other systems as well.

The tow vehicle 102 may move across the road surface by various combinations of movements relative to three mutually perpendicular axes defined by the tow vehicle 102: a transverse axis $X_V$, a fore-aft axis $Y_V$, and a central vertical axis $Z_V$. The transverse axis $X_V$ extends between a right side R and a left side of the tow vehicle 102. A forward drive direction along the fore-aft axis $Y_V$ is designated as $F_V$, also referred to as a forward motion. In addition, an aft or rearward drive direction along the fore-aft direction $Y_V$ is designated as $R_V$, also referred to as rearward motion. In some examples, the tow vehicle 102 includes a suspension system (not shown), which when adjusted causes the tow vehicle 102 to tilt about the $X_V$ axis and or the $Y_V$ axis, or move along the central vertical axis $Z_V$. As the tow vehicle 102 moves, the trailer 104 follows along a path of the tow vehicle 102.

Moreover, the trailer 104 follows the tow vehicle 102 across the road surface by various combinations of movements relative to three mutually perpendicular axes defined by the trailer 104: a trailer transverse axis $X_T$, a trailer fore-aft axis $Y_T$, and a trailer central vertical axis $Z_T$. The trailer transverse axis $X_T$ extends between a right side R and a left side of the trailer 104. A forward drive direction along the trailer fore-aft axis $Y_T$ is designated as $F_T$, also referred to as a forward motion. In addition, a trailer aft or rearward drive direction along the fore-aft direction $Y_T$ is designated as $R_T$, also referred to as rearward motion. Therefore, movement of the vehicle-trailer system 100 includes movement of the tow vehicle 102 along its transverse axis $X_V$, fore-aft axis $Y_V$, and central vertical axis $Z_V$, and movement of the trailer 104 along its trailer transverse axis $X_T$, trailer fore-aft axis $Y_T$, and trailer central vertical axis $Z_T$.

In some implementations, the tow vehicle 102 includes a sensor system 120 that provide sensor system data 122 that may be used to determine that the tow vehicle 102 is backing up towards the trailer 104 or that a trailer 104 is positioned behind the tow vehicle 102. In some examples, the vehicle 102 may be autonomous or semi-autonomous, therefore, the sensor system 120 provides reliable and robust autonomous driving. The sensor system 120 provides sensor system data 122 and may include different types of sensors 124, 126 that may be used separately or with one another to create a perception of the tow vehicle's environment or a portion thereof (for examples, the rearward environment of the tow vehicle 102) that is used by the vehicle 102 to identify object(s) in its environment such as objects positioned in front and/or to the side of the tow vehicle, or the trailer 104 positioned behind the tow vehicle 102. In some examples, the sensor system 120 includes one or more sensors 124, 126 supported by the rear portion of the tow vehicle 102 and provides sensor system data 122 associated with object(s) and the trailer 104 positioned behind the tow vehicle 102. The tow vehicle 102 may support the sensor system 120; while in other examples, the sensor system 120 is supported by the vehicle 102 and the trailer 104.

The sensor system 120 may include sensors 124, 126 that provide data associated with the environment of the tow vehicle 102, for example, sensors positioned to capture data of the environment of the tow vehicle 102. In some examples, the sensor system 120 includes sensors 124, 126 positioned to capture data associated with the rear environment of the tow vehicle 102. In some examples, the sensors 124, 126 also provide data associated with the tow vehicle 102 and/or the interior of the tow vehicle 102. For example, the sensors 124, 126 may capture data that detects a presence of the driver within the tow vehicle 102.

The sensor system 120 may include, but is not limited to, one or more imaging devices 124, 124a-n (such as camera(s)), and sensors 126, 126a-n such as, but not limited to, radar, sonar, LIDAR (Light Detection and Ranging, which can entail optical remote sensing that measures properties of scattered light to find range and/or other information of a distant target), LADAR (Laser Detection and Ranging), ultrasonic sensors, etc. The sensor system 120 provides sensor system data 122 that includes images 125 from the one or more cameras 124 and sensor data 127 from the one or more sensors 126b, 126a-n. In some examples, the sensor system 120 includes a driver seat sensor 126 that determines a driver seat occupancy. In some implementations, the sensor system 120 includes a controller (not shown) that processes the sensor system data 122, while in other examples, the sensor system 120 sends the received sensor system data 122 to the vehicle controller 150 which in turn processes the received sensor system data 122 (as shown in FIG. 2).

The tow vehicle 102 includes a vehicle light system 130 that includes rearward facing lights 132, 132a-d, such as, but not limited to, tail lights 132a, brake lights 132b, reverse lights 132c, and center high mount stop lights (CHMSL) 132d. In addition, the vehicle light system 130 includes other lights 132, 132e-n such as front facing lights and side facing lights. In some implementations, the driver may determine one or more lights 132a-132n of the vehicle light system 130 to be turned on when the vehicle 102 is in a PARK position. Such determination may be made in a settings menu by way of a user interface 140.

The tow vehicle 102 may include the user interface 140, such as a display. The user interface 140 is configured to display information to the driver. In some examples, the user interface 140 is configured to receive one or more user commands from the driver via one or more input mechanisms or a touch screen display and/or displays one or more notifications to the driver. In some examples, the user interface 140 is a touch screen display. In other examples, the user interface 140 is not a touchscreen and the driver may use an input device, such as, but not limited to, a rotary knob or a mouse to make a selection. In some examples, the driver may interact with the user interface 140 to turn on or off one or more lights 132*a*-132*n* of the vehicle light system 130 to be turned on when the vehicle 102 is in a PARK position. Additionally, in some examples, the user interface 140 may provide a toggle switch button, that turns On or Off preselected one or more lights 132*a*-132*n* of the vehicle light system 130 when the vehicle 102 is in a PARK position.

The sensor system 120, the vehicle light system 130, and the user interface 140 are in communication with a vehicle controller 150. The vehicle controller 150 includes a computing device (or data processing hardware) 152 (e.g., central processing unit having one or more computing processors) in communication with non-transitory memory or hardware memory 154 (e.g., a hard disk, flash memory, random-access memory) capable of storing instructions executable on the computing processor(s)). In some example, the non-transitory memory 154 stores instructions that when executed on the computing device 152 cause the vehicle controller 150 to provide a signal or command 158 to the vehicle light system 130 causing the vehicle light system 130 to turn on one or more vehicle lights 132, 132*a*-*n* or to maintain an ON status of the one or more vehicle lights 132, 132*a*-*n*. In other words, the signal or command 158 causes the vehicle light system 130 to update a status of one or more vehicle lights 132, 132*a*-*n*.

As shown, the vehicle controller 150 is supported by the tow vehicle 102; however, the vehicle controller 150 may be separate from the tow vehicle 102 and in communication with the tow vehicle 102 via a network (not shown).

The vehicle controller 150 receives sensor system data 122 and based on the received sensor system data 122, the controller 150 determines whether to instruct the vehicle light system 130 to change or maintain the ON status of one or more vehicle lights 132, 132*a*-*n* allowing the driver to easily and more safely hitch or unhitch the trailer 104. In some examples, the controller 150 analyses vehicle driving behavior and based on the analyzed vehicle driving behavior, the vehicle controller 150 determines whether to instruct the vehicle light system 130 to change or maintain the ON status of one or more vehicle lights 132, 132*a*-*n*. The instructions 158 from the controller 150 to the vehicle light system 130 include instructing the vehicle lights 132, 132*a*-*n* to stay on for a predefined period of time after the driver places the vehicle shift lever in Park and/or after the driver opens his door. In some examples, the predefined period of time is determined by the driver in the vehicle settings.

The vehicle controller 150 relies on one or more sensors 124-126 to determine whether to instruct the vehicle light system 130 to change or maintain the ON status of the one or more vehicle lights 132, 132*a*-*n*. In some examples, the vehicle controller 150 receives sensor data 127 from the steering wheel (not shown) of the tow vehicle 102 as the tow vehicle 102 is maneuvering in the rearward direction $R_V$. The controller 150 analyzes the sensor data 127 received from the steering wheel and determines whether the tow vehicle 102 is approaching the trailer 104. If the controller 150 determines that the tow vehicle 102 is approaching the trailer 104, then the controller 150 sends instructions 156 to the vehicle light system 130 to update the status of the one or more vehicle lights 132, 132*a*-*n* to an ON status.

In some examples, when the controller 150 determines that the tow vehicle 102 is approaching the trailer 104, the controller 150 may send display instructions 158*a* to the user interface 140 causing the user interface 140 to display a message asking the driver if he/she wants to keep one or more lights 132*a*-*n* of the vehicle light system 130 ON. In some examples, the message 158*a* is displayed when the driver places the vehicle shift lever in Park. The driver may make a selection 158*b* by way of the user interface 140. In some examples, the driver may select which lights 132*a*-*n* to keep ON. If the driver indicates in his/her selection 158*b* that he/she wants to keep one or more lights 132*a*-*n* ON, then the controller 150 instructs the vehicle light system 130 to change or maintain the ON status of the one or more vehicle lights 132, 132*a*-*n* (e.g., previously selected by the driver).

In some examples, the controller 150 receives sensor system data 122 indicative of the driver door (not shown) being open after determining that the tow vehicle 102 has approached the trailer 104 (for example, by way of analyzing the sensor system data 122 received from the steering wheel) and that the driver has placed the vehicle shift lever in Park. In this case, the controller 150 sends instructions 156 to the vehicle light system 130 to change or maintain the ON status of the one or more vehicle lights 132, 132*a*-*n* (e.g., previously selected by the driver).

As previously described, in some implementations, one or more cameras 124 and/or one or more sensors 126 of the sensor system 120 are supported by a rear portion of the tow vehicle 102. As such, the rearward camera(s) and/or the rearward sensor(s) 126 capture sensor system data 122 (i.e., images 125 and/or sensor data 127) of the rearward environment of the tow vehicle 102. The controller 150 may receive sensor system data 122 from the rearward camera(s) and/or the rearward sensor(s) 126, then the controller 150 may analyze the received sensor system data 122 to determine if the trailer 104 is positioned behind the tow vehicle 102 for hitching/unhitching. If the controller 150 determines that the trailer 104 is positioned behind the tow vehicle 102, then the controller 150 sends instructions 156 to the vehicle light system 130 causing one or more lights 132, 132*a*-*n* to change or maintain the ON status of the one or more vehicle lights 132, 132*a*-*n* (e.g., previously selected by the driver).

In some implementations, the controller 150 analyzes the received sensor system data 122 from cameras 124 and/or sensors 126 positioned on the rear portion of the tow vehicle 102 and/or positioned on the side of the tow vehicle 102 to determine a movement of the driver from the side of the tow vehicle 102 to the back of the tow vehicle or a position of the driver behind the tow vehicle 102. If the controller 150 determines that driver is moving towards the rear of the tow vehicle or is positioned behind the tow vehicle 102, then the controller 150 sends instructions 156 to the vehicle light system 130 causing one or more lights 132, 132*a*-*n* to change or maintain the ON status of the one or more vehicle lights 132, 132*a*-*n* (e.g., previously selected by the driver).

In some examples, the controller 150 receives sensor system data 122 from one or more camera 124 and/or sensor 126 positioned within the tow vehicle 102 to detect if the driver is positioned in the driver seat. If the controller 150 determines that driver is not sitting in the driver seat, and that the driver door is open or that the driver has moved to the back of the tow vehicle 102 or that the driver is behind the tow vehicle 102, then the controller 150 sends instructions 156 to the vehicle light system 130 causing one or more lights 132, 132a-n to change or maintain the ON status of the one or more vehicle lights 132, 132a-n (e.g., previously selected by the driver).

In some examples, the tow vehicle 102 includes a switch button (not shown) that changes or maintains the ON status of the one or more vehicle lights 132, 132a-n. The button may be positioned in the tow vehicle 102, for example on the dashboard or as part of the user interface 140. In some examples, the button is positioned on a back portion of the vehicle 102. When the driver presses or selects the button, the controller 150 sends instructions 156 to the vehicle light system 130 causing one or more lights 132, 132a-n to change or maintain the ON status of the one or more vehicle lights 132, 132a-n (e.g., previously selected by the driver).

FIG. 3 provides an example arrangement of operations of a method 300 for controlling one or more lights 132a-132n of a light system 130 supported by a vehicle 102 (e.g., a tow vehicle 102) as described in FIGS. 1A, 1B and 2. At block 302, the method 300 includes receiving, at data processing hardware 152, sensor system data 122 from a sensor system 120 supported by the vehicle 102. A controller 150 includes the data processing hardware 152 and memory hardware 154 in communication with the data processing hardware 152). At block 304, the method 300 includes determining, at the data processing hardware 152, a current status associated with the one or more lights 132a-132n of the vehicle light system 130 (e.g., an ON status or an OFF status). At block 306, the method 300 includes determining, at the data processing hardware 152, an updated status associated with the one or more lights of the vehicle light system 130 based on the sensor system data 122. At block 308, the method 300 includes transmitting, from the data processing hardware 152 to the light system 130 in communication with the data processing hardware 152, instructions 156 causing the one or more lights 132a-132n to adjust their current status based on the updated status.

In some examples, the one or more lights 132a-132n are facing a rearward direction with respect to the vehicle 102 and are configured to illuminate a rearward environment of the vehicle 102. The one or more lights 132a-132n may include at least one of a tail light 132a, a brake light 132b, a reverse light 132c, and a stop light 132d. Additionally, the one or more lights 132a-132n may include side vehicle lights positioned on the side of the vehicle.

In some implementations, the sensor system data 122 includes images 125 captured by one or more cameras 124, 124a-n positioned to face a rearward environment of the vehicle. Additionally or alternatively, the sensor system data 122 may include sensor data 127 captured by one or more sensors 126, 126a-n positioned to face a rearward environment of the vehicle 102. Additionally or alternatively, in some examples, the sensor system data 122 includes driver data indicative of a status of the driver in the vehicle. The driver data may be captured by a seat sensor (not shown), one or more camera 124, 124a-n or one or more sensors 126, 126a-n positioned to capture data associated with the driver and the driver seat. In some examples, the sensor system data 122 includes data from a door sensor indicative of a driver door status being open or closed. In some examples, the updated status extends for a predetermined period of time.

In some implementations, the method 300 includes receiving steering wheel data during a rearward maneuver of the vehicle 102 and determining a vehicle behavior indicative of the vehicle 102 approaching a trailer 104 based on the sensor system data 122 and the steering wheel data 127. In some examples, the vehicle behavior is determined by sensor data indicative of the trailer 104 behind the vehicle 102 and the steering wheel data. The updated status associated with the one or more lights of the vehicle light system is based on the vehicle behavior.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method for controlling one or more lights of a light system supported by a vehicle, the method comprising:
   receiving, at data processing hardware, driver data indicative of a status of a driver in the vehicle;
   receiving, at data processing hardware, sensor system data from a sensor system supported by the vehicle, the sensor system data including a movement status indicative of the driver moving from a driver side of the vehicle to a back side of the vehicle;
   determining, at the data processing hardware, a current status associated with the one or more lights of the vehicle light system;
   when the driver status indicates that the driver is not in the vehicle and the movement status indicates that the driver moved to the back side of the vehicle:
      determining, at the data processing hardware, an updated status of the one or more lights of the vehicle light system; and
      transmitting, from the data processing hardware to the light system in communication with the data processing hardware, instructions causing the one or more lights to adjust their current status based on the updated status.

2. The method of claim 1, wherein the one or more lights are facing a rearward direction with respect to the vehicle and are configured to illuminate a rearward environment of the vehicle.

3. The method of claim 1, wherein the one or more lights include at least one of a tail light, a brake light, a reverse light, and a stop light.

4. The method of claim 1, wherein the sensor system data includes images captured by one or more cameras positioned to face a rearward environment of the vehicle.

5. The method of claim 1, wherein the sensor system data includes sensor data captured by one or more sensors positioned to face a rearward environment of the vehicle.

6. The method of claim 1, wherein the sensor system data includes data from a door sensor indicative of a driver door status being open or closed.

7. The method of claim 1, further including:
   receiving steering wheel data during a rearward maneuver of the vehicle; and
   determining a vehicle behavior indicative of the vehicle approaching a trailer based on the sensor system data and the steering wheel data,
   wherein the updated status associated with the one or more lights of the vehicle light system is based on the vehicle behavior.

8. The method of claim 1, wherein the updated status extends for a predetermined period of time.

9. A system for controlling one or more lights of a light system supported by a vehicle, the system comprising:
   a vehicle light system including one or more lights;
   data processing hardware in communication with the vehicle light system; and
   memory hardware in communication with the data processing hardware, the memory hardware storing instructions that when executed on the data processing hardware cause the data processing hardware to perform operations comprising:
      receiving driver data indicative of a status of a driver in the vehicle;
      receiving sensor system data from a sensor system supported by the vehicle, the sensor system data including a movement status indicative of the driver moving from a driver side of the vehicle to a back side of the vehicle;
      determining a current status associated with the one or more lights of the vehicle light system;
      when the driver status indicates that the driver is not in the vehicle and the movement status indicates that the driver moved to the back side of the vehicle:
         determining an updated status of the one or more lights of the vehicle light; and
         transmitting instructions to the vehicle light system, the instructions causing the one or more lights to adjust their current status based on the updated status.

10. The system of claim 9, wherein the one or more lights are facing a rearward direction with respect to the vehicle and are configured to illuminate a rearward environment of the vehicle.

11. The system of claim 9, wherein the one or more lights include at least one of a tail light, a brake light, a reverse light, and a stop light.

12. The system of claim 9, wherein the sensor system data includes images captured by one or more cameras positioned to face a rearward environment of the vehicle.

13. The system of claim 9, wherein the sensor system data includes sensor data captured by one or more sensors positioned to face a rearward environment of the vehicle.

14. The system of claim 9, wherein the sensor system data includes data from a door sensor indicative of a driver door status being open or closed.

15. The system of claim 9, wherein the operations further include:
   receiving steering wheel data during a rearward maneuver of the vehicle; and
   determining a vehicle behavior indicative of the vehicle approaching a trailer based on the sensor system data and the steering wheel data,
   wherein the updated status associated with the one or more lights of the vehicle light system is based on the vehicle behavior.

16. The system of claim 9, wherein the updated status extends for a predetermined period of time.

* * * * *